June 20, 1933.  P. W. JOHNSON  1,915,231
BUMPER
Filed Nov. 27, 1931  2 Sheets-Sheet 1

Inventor:
Percy W. Johnson
by Anders & Wood
His Attorneys

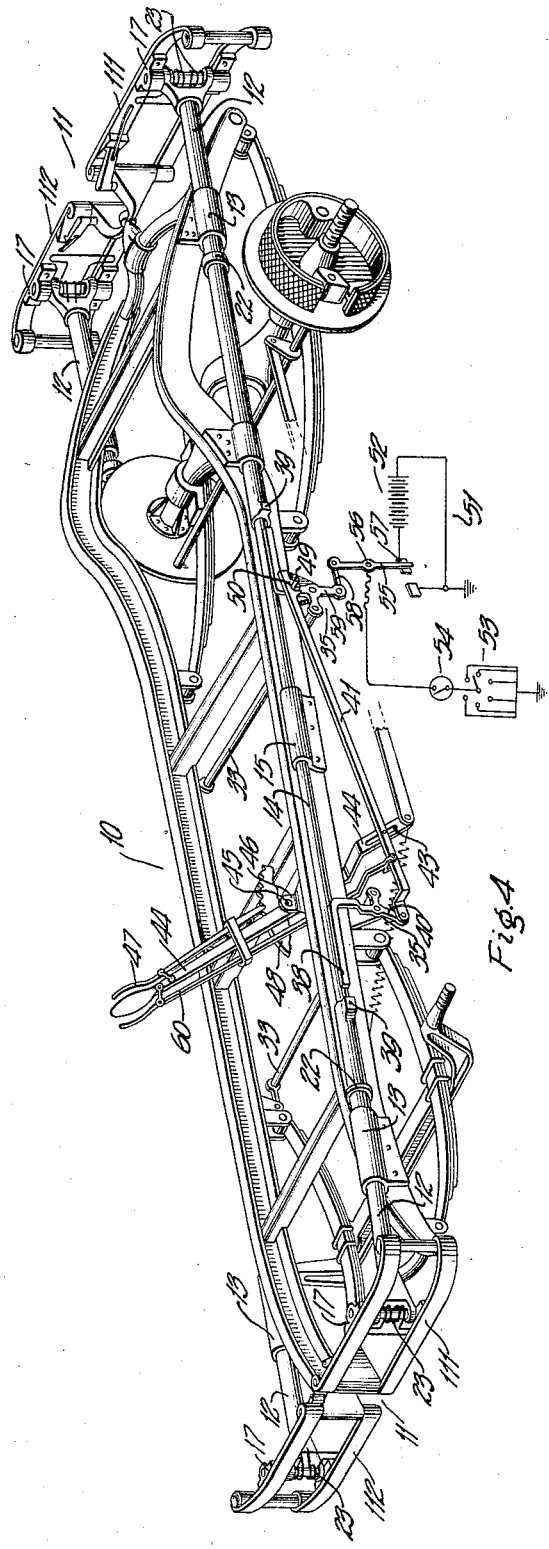

Patented June 20, 1933

1,915,231

UNITED STATES PATENT OFFICE

PERCY W. JOHNSON, OF ALBANY, NEW YORK

BUMPER

Application filed November 27, 1931. Serial No. 577,416.

One of the objects of my invention is the provision of a bumper divided into sections which are biased to rotate in such a direction as to move an object, when encountered by the bumper, out of the path of the vehicle.

Another object of my invention is the provision of means for actuating a brake of the vehicle when the bumper strikes an object. A still further object of my invention is the provision of means for opening the ignition circuit of a vehicle when an object is encountered in the foregoing manner.

Other objects of my invention will appear in the specification and will be particularly pointed out in the claims.

My invention will best be understood by reference to the accompanying drawings in which I have illustrated a preferred embodiment thereof and in which—

Figure 1:
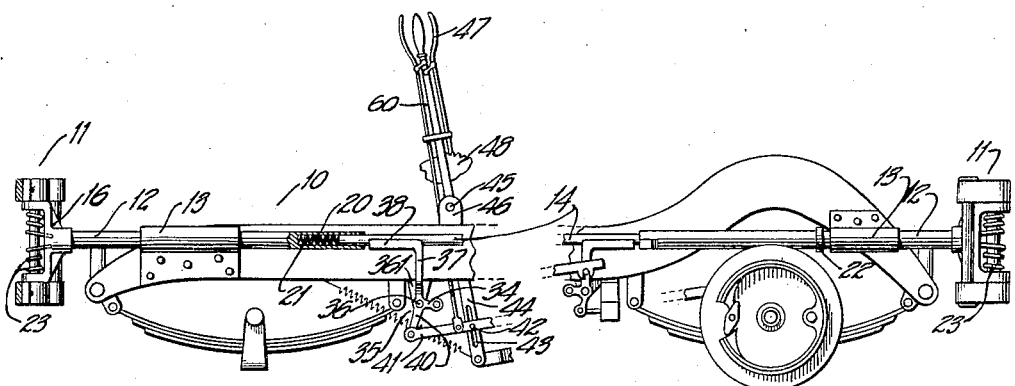
Fig. 1 is a side view of the chassis of a vehicle and the parts embodying my invention mounted thereon.

Fig. 4 is a perspective view of the parts shown in Fig. 1 and also illustrating diagrammatically the ignition circuit for the vehicle; and Figs. 5, 6, and 7 are detail views illustrating the normal position of one section of a bumper, the position it assumes when it has encountered an obstacle and the position that it occupies when the bumper has been rotated to move the obstacle from the path of the vehicle, respectively.

Like reference characters indicate like parts throughout the drawings.

Referring now to the drawings, 10 indicates generally the chassis of an automobile on the front and rear of which is mounted a bumper indicated at 11. As the construction and operation of the bumper at each end of the vehicle are the same, or substantially the same, and as the construction and operation of one of the sections of a given bumper are the same as that of the other section, the description of one section will suffice for all four sections.

The front bumper comprises two sections 111 and 112 mounted on longitudinally movable members 12 which are shown in the form of round bars or rods having their bearings at 13 secured to the chassis. The members 12 at the front and rear of the vehicle telescope with a rod 14 as best shown in Fig. 1, the rod extending from the bar 12 at one end of the vehicle to the bar 12 at the other end of the vehicle and having a bearing at 15 which is also secured to the chassis of the vehicle.

Figure 3:
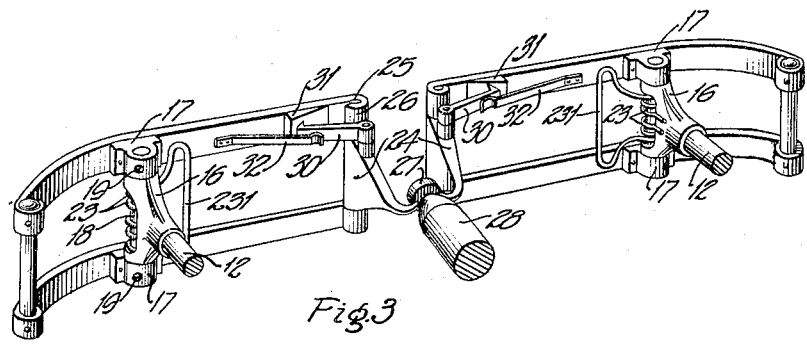
Fig. 3 is a perspective view, partially in section, of a bumper embodying my invention.

For convenience, I will describe the section 111 of the bumper located at the front end of the vehicle. To the front end of the bar 12 is secured a forked member 16 and the upper and lower horizontal bars of the section 111 are provided with respective lugs 17 which engage the upper and lower portions of the yoke 16 as best shown in Fig. 3. A bar 18 passes through the openings in the lugs 17 and the prongs of the yoke 16, and is preferably secured to the lugs as by set screws 19.

Means is provided for yieldingly resisting the longitudinal movement of the bars 12, and in the embodiment illustrated, comprises a spring 20 located in a recess 21 formed in the rear end of the bar 12 (Fig. 1) and disposed between the bottom of the recess and the bar 14. A collar 22 is preferably secured to the bar 12 at the rear of the bearing 13 and which limits the forward movement of the bar 12.

Means is also provided for rotating either section of the bumper about the axis 18. In the embodiment illustrated, the bar 18 is surrounded by the coiled portions of a tension spring 23 which are wound around the bar from the intermediate portion thereof, the ends of the spring preferably engaging the yoke 16 as best shown at the right-hand portion of Fig. 3. The spring also comprises a looped portion 231 which engages both the upper and lower transverse bars of a given section, the coil spring being under tension in such a way as to tend to force the section of the bumper to rotate about its axis, the inner portions of each section tending to rotate forwardly with respect to the front end of the vehicle and the outer ends thereof simultaneously moving to the rear.

Means is also provided for normally locking the sections of the bumper so that they are in alignment with each other. In the embodiment illustrated, such means comprises a latch 24 mounted on a bar or rod 25 which may conveniently be secured to the inner bent ends 26 of a section of the bumper. Normally the latch 24 engages a detent in the form of a head 27 on a member 28 secured to a cross bar 29 of the chassis.

On the detent 24 is pivotally mounted another detent 30 which is adapted to engage a lug 31 mounted on one of the transverse bars of the section of the bumper, the upper bar in the embodiment illustrated, and the pawl or detent 30 is forced forwardly by a spring 32.

Figure 2:
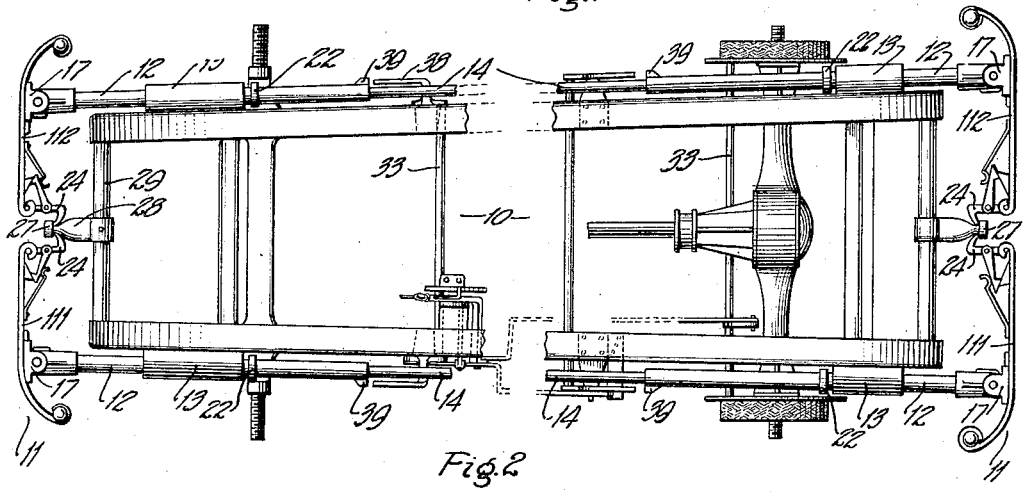
Fig. 2 is a plan view.

The operation of so much of my invention as has hitherto been described will readily be understood and is as follows:

Assuming that the section 111 of the bumper encounters an obstacle, such as a person in the path of the vehicle, the impact forces the bar 12 on which that section of the bumper is mounted rearwardly against the spring 20 and compresses the same. The collar 22 at the rear of the vehicle serves to limit the rearward movement of the bar 12. At the same time the detent 24 rides rearwardly along the inclined portion of the member 28 as indicated in Fig. 6 until the detent 30 engages the lug 31 and the spring 32 retains the detent 30, in locked position. The looped portion 231 of the spring 23 causes the section 111 of the bumper to rotate anti-clockwise as viewed in Fig. 2, and to the position shown in Fig. 6, thereby tending to sweep the obstacle in front of the bumper to the left along the incline of the section out of the path of the vehicle. During the rotation of the section of the bumper, the detent 30 which now engages the lug prevents the detent 24 from re-engaging the head 27 as will be evident from Figs. 6 and 7.

In accordance with my invention, means are also preferably provided for actuating the emergency brake of the vehicle when either section of either the front or rear bumper is actuated in the manner heretofore described.

Again considering the bumper and the associated parts at the front end of the vehicle, a cross bar 33 extends transversely of the vehicle and on each end thereof is mounted an arm 34 of a three-armed lever indicated generally at 35, said lever being pivoted at 36 on a bracket 361. The upper arm 37 of said lever is provided with a forwardly extending member 38 which is located in the path of a lug 39 on the bar 12. The lower arm 40 of the three-armed lever is pivoted to a link 41 provided with a pin 42 engaging within a slot 43 in the lower portion of the emergency brake handle 44 pivoted at 45 on a bracket 46 secured to the chassis. The brake handle is provided with the usual hand latch 47 engaging a ratchet 48.

A cross bar 33 is also provided at the rear of the vehicle. Three-armed levers indicated generally at 35 are also provided on either side of the vehicle at the rear portion thereof and which are operated by the sections of the rear bumper in the same manner as the corresponding levers at the front end of the vehicle. These three-armed levers are also connected by a cross bar 33, and the actuation of either of the three-armed levers by the associated section of the bumper will move the link 41 by means of a pin 49 which is received in a recess 50 in an enlarged portion of the link 41 and thereby actuates the emergency brake in a manner that will be obvious.

Means are also preferably provided for opening the ignition circuit of the vehicle when either section of either of the bumpers is operated in the manner heretofore described. Referring to Fig. 4, 51 indicates an ignition circuit including a battery 52, a distributor 53 and the usual manually operated ignition switch 54, the circuit being grounded as indicated. The circuit is controlled by a lever 55 pivoted at 56, the end of the lever engaging a contact 57 included in the circuit. To the upper end of the lever is pivotally connected a link 58, the other end of which is connected to an arm 59 of the three-armed lever 35. When the rear bumper of the vehicle encounters an obstacle, the three-armed lever 35 is rotated about its pivot, and when the front bumper encounters an obstacle, the link 41 is actuated to rotate the three-armed lever 35 about its pivot, and in either case the three-armed lever is rotated anti-clockwise as viewed in Fig. 4, and the ignition circuit is opened at the contact 57.

In order to prevent the opening of the ignition circuit by the ordinary operation of the emergency brake handle, the latter is provided with a manually operated link 60 which is raised when the operator grasps the handle to raise the link 41 and thereby disengage the same from the pin 49.

While I have described my invention in its preferred embodiment it is to be understood that the words which I have used are words of description and not of limitation and that changes within the scope of the appended claims may be made without departing from the true scope and spirit of my invention in its broader aspects.

What I claim is:

1. In combination, a vehicle, a bumper comprising two sections pivotally mounted on the respective sides of the vehicle, a locking member comprising a head secured to the chassis, latches mounted on the respective sections adapted to engage said head and normally retain said sections in substantial alignment, means responsive to an impact against either section for releasing the associated lock from said head, and means for rotating the section when released about the pivot.

2. In combination, a vehicle, a bumper comprising two sections pivotally mounted on the respective sides of the vehicle and bodily movable with respect thereto, means for yieldingly resisting the movement of said sections, means for normally locking the respective sections in substantial alignment, means responsive to an impact against either section for releasing the associated locking means, and means for rotating the section receiving the impact about its pivot.

PERCY W. JOHNSON.